Jan. 31, 1967 A. E. HARROLD 3,301,970
DATA STORAGE ARRANGEMENTS
Filed Oct. 29, 1965 5 Sheets-Sheet 1

INVENTOR
ARTHUR EDWARD HARROLD
BY
Kirschstein, Kirschstein & Ottinger
ATTORNEYS

Jan. 31, 1967 A. E. HARROLD 3,301,970

DATA STORAGE ARRANGEMENTS

Filed Oct. 29, 1965 5 Sheets-Sheet 2

INVENTOR
ARTHUR EDWARD HARROLD
BY
Kirschstein, Kirschstein & Ottinger
ATTORNEYS

INVENTOR
ARTHUR EDWARD HARROLD
BY
Kirschstein, Kirschstein & Ottinger
ATTORNEYS

Jan. 31, 1967 A. E. HARROLD 3,301,970

DATA STORAGE ARRANGEMENTS

Filed Oct. 29, 1965 5 Sheets-Sheet 4

INVENTOR
ARTHUR EDWARD HARROLD
BY
Kinzler, Kinzler & Ottinger
ATTORNEYS

INVENTOR
ARTHUR EDWARD HARROLD
BY
Kirschstein, Kirschstein & Ottinger
ATTORNEYS 3,301,970
DATA STORAGE ARRANGEMENTS
Arthur Edward Harrold, Hurworth on Tees, England, assignor to The General Electric Company, Limited, London, England
Filed Oct. 29, 1965, Ser. No. 505,620
17 Claims. (Cl. 200—5)

This invention relates to data storage arrangements.

The invention is particularly concerned with data storage arrangements of the kind in which data to be stored is entered by the selective manual actuation of a plurality of push-buttons or other operating members.

Data storage arrangements of this kind are used, for example in key-sending equipments that are used in automatic telephone systems as an alternative to telephone dials.

It is an object of the present invention to provide an improved data storage arrangement of the kind specified above.

According to the present invention, in a data storage arrangement in which data to be stored is entered by the selective manual actuation of a plurality of operating members, there are provided a plurality of resilient members which are associated with a plurality of further members respectively and an operating mechanism arranged so that as the result of the actuation of any operating member a resilient member associated with this operating member is deflected from a normal position thereof and relative movement is obtained between the resilient members and the further members such that the deflected resilient member is then held deflected by its engagement of the associated further member.

According to a feature of the present invention, in a data storage arrangement in which data to be stored is entered by the selective manual actuation of a plurality of operating members, there are provided a plurality of resilient members which are arranged in a plurality of rows and a plurality of lines that each comprises one resilient member of each row, a plurality of further members associated with the plurality of lines of resilient members respectively and an operating mechanism arranged so that as the result of the actuation of any operating member a resilient member associated with this operating member is deflected from a normal position thereof and relative movement is obtained between the resilient members and the further members such that the deflected resilient member is then held deflected by its engagement of the associated further member; the arrangement being such that the resilient members that engage further members as the result of consecutive actuations of the operating members are in consecutive rows.

Figure 1:
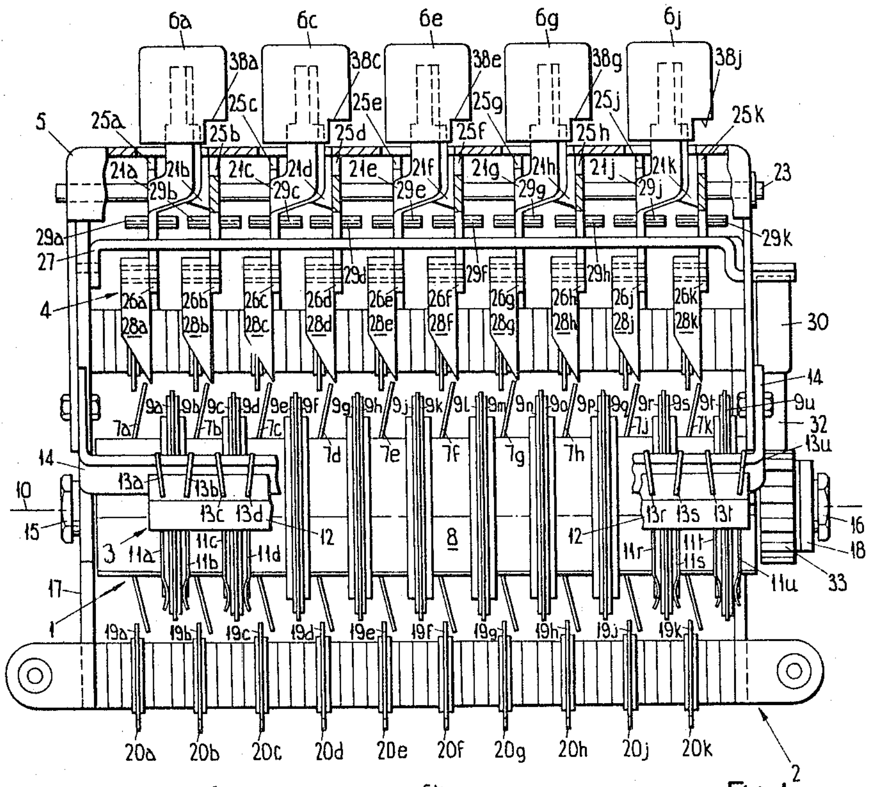
Figure 2:
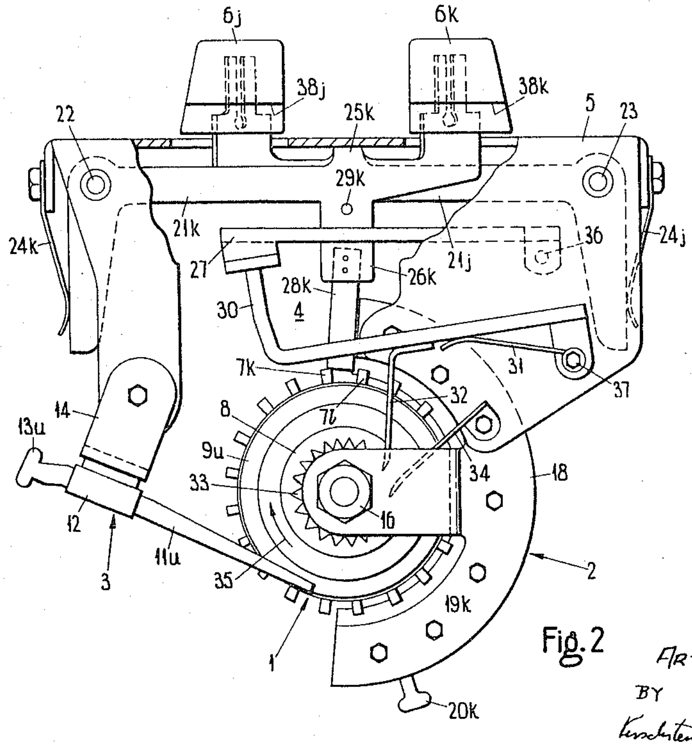
Figure 3:
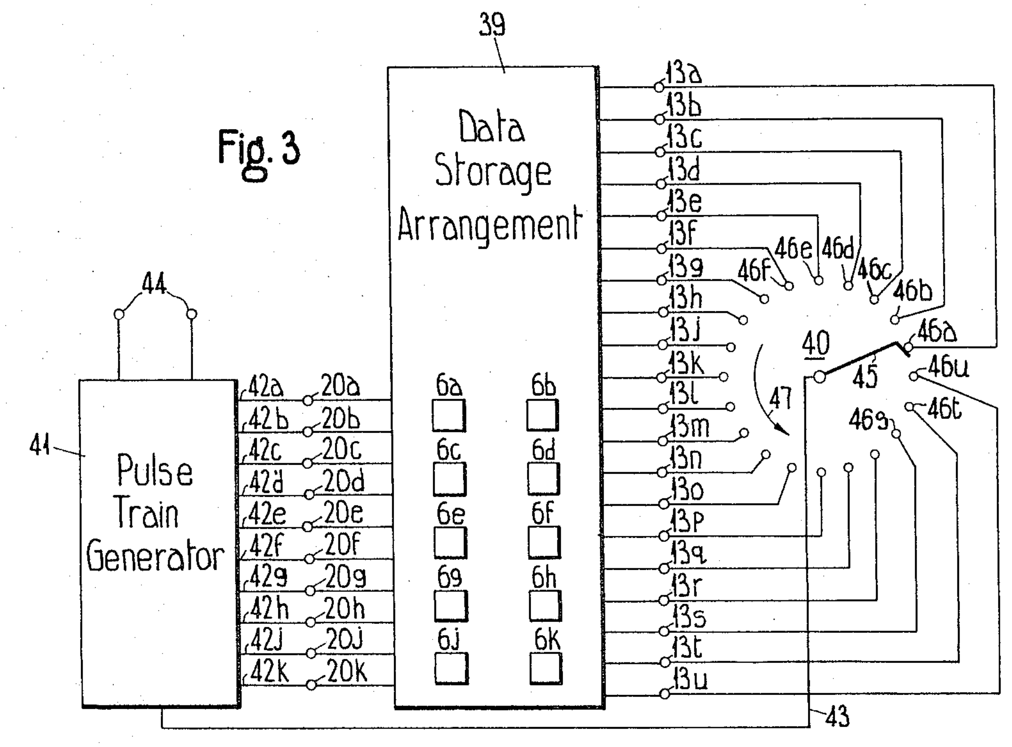
Figure 5:
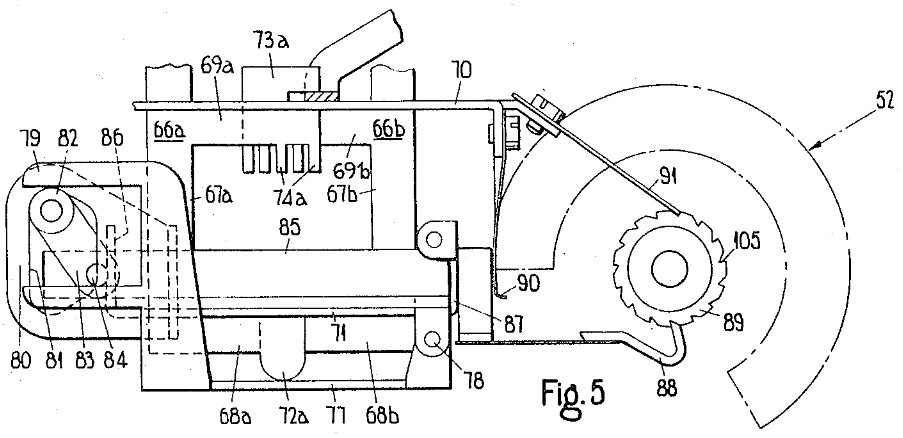
Figure 4:
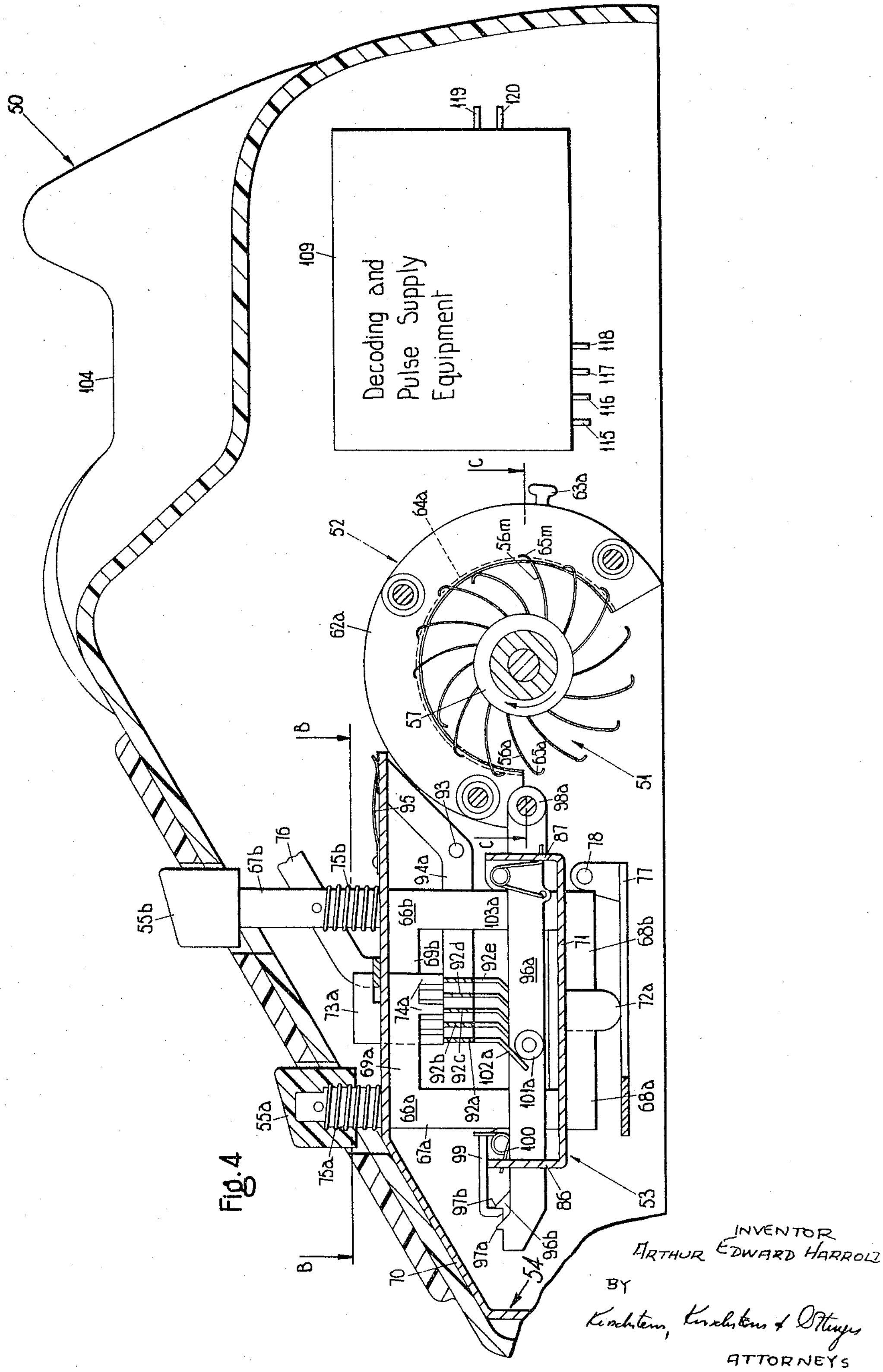
Figure 6:
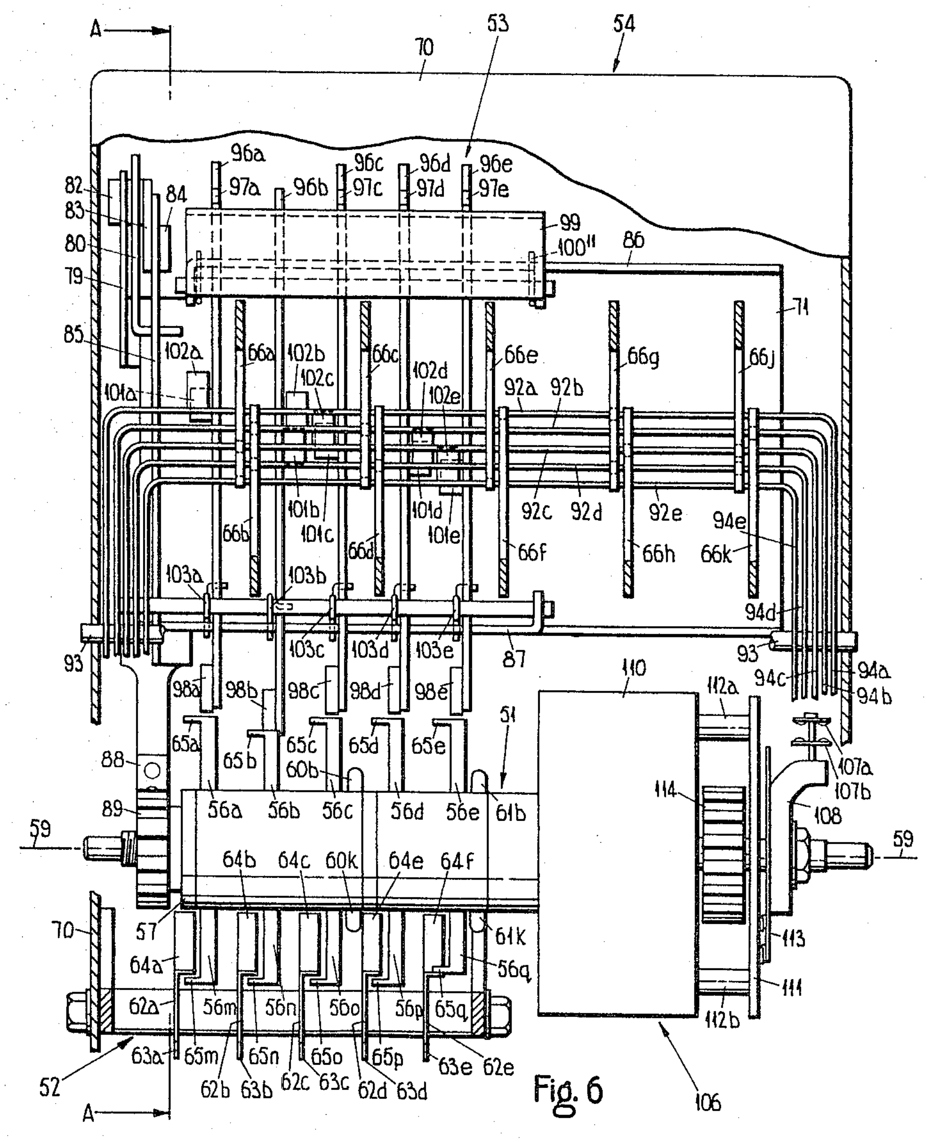
Figure 7:
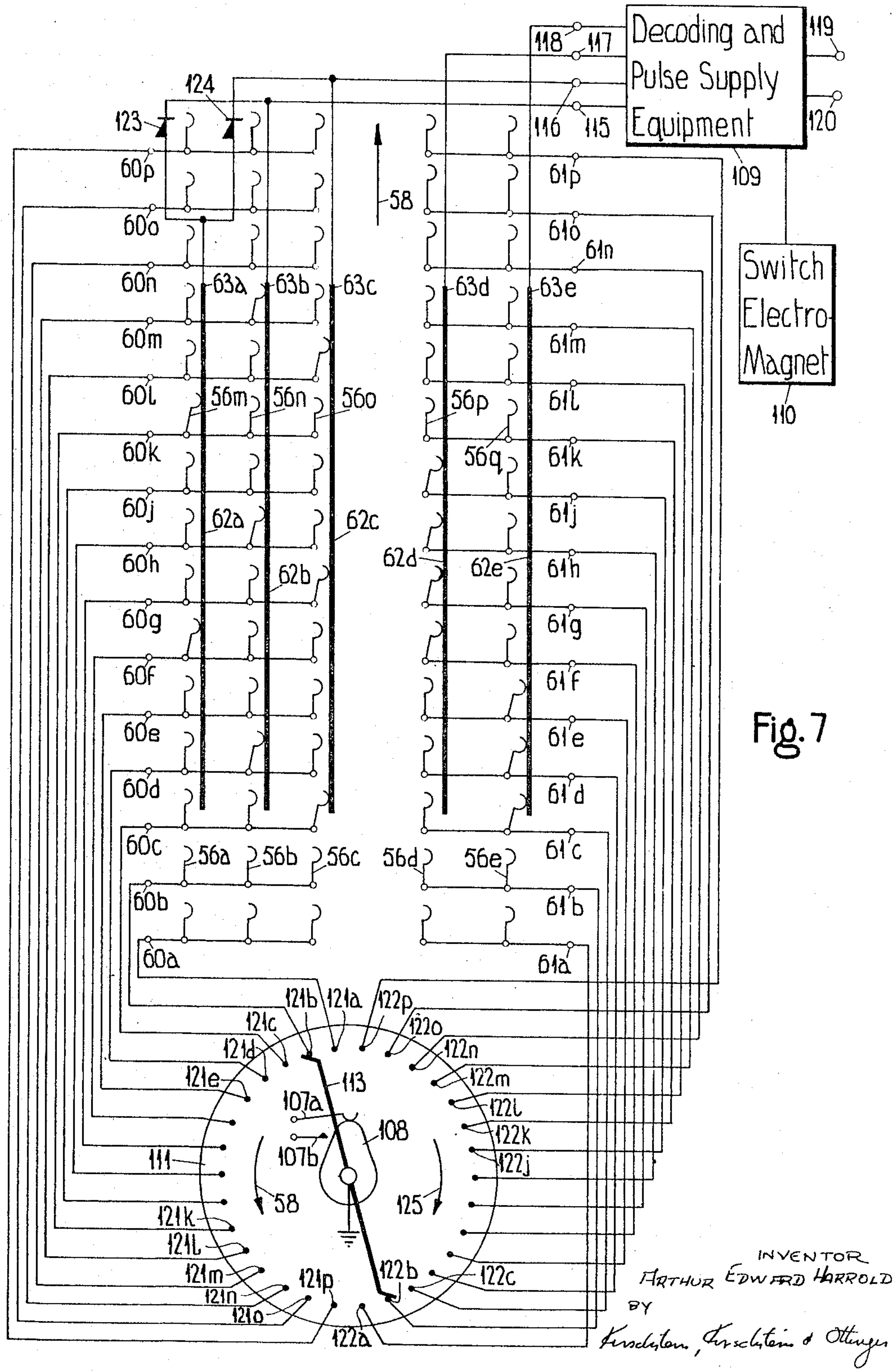

Two data storage arrangements in accordance with the present invention will now be described by way of example with reference to the seven figures of the accompanying drawings in which:

FIGURES 1 and 2 are respectively a side elevation and an end elevation of the first example of data storage arrangement, FIGURE 3 shows diagrammatically key-sending equipment incorporating the first example of data storage arrangement, FIGURE 4 shows a cross-section through the second example of data storage arrangement, FIGURE 5 shows part of an end elevation of this second example, FIGURE 6 shows a plan view of this second example, and FIGURE 7 shows diagrammatically key-sending equipment incorporating the second example of data storage arrangement.

Each example of data storage arrangement to be described has a plurality of digit stores each adapted to store any one of the decimal digit values one to ten and an operating mechanism in which ten push-buttons are actuable respectively to enter these ten digit values into these stores and which is arranged, as will be hereinafter described, so that the digits entered by consecutive actuations of the push-buttons are each stored in a different one of the digit stores.

Referring to FIGURES 1 and 2, the first example of data storage arrangement to be described has twenty digit stores and comprises a rotatable drum assembly 1 which incorporates these stores, a contact bank 2, a wiper assembly 3 and an operating mechanism 4 all carried by a metal framework 5. The operating mechanism 4 includes ten push-buttons 6 which are arranged in two parallel rows of five each and of which only the push-buttons *6a*, *6c*, *6e*, *6g*, *6j* and *6k* are shown that are actuable respectively to enter the digit values one, three, five, seven, nine and ten.

Each digit store comprises a different one of twenty rows of contact springs 7 which extend outwardly from the body 8 of the drum assembly 1, and a different one of twenty slip rings 9 which are incorporated in that assembly, each slip ring 9 being connected electrically to all ten contact springs 7 in the associated row. The contact springs 7 in each row are interconnected electrically within the body 8 which serves to insulate electrically the various rows from each other and from the framework 5. The rows of contact springs 7 are parallel to the axis of rotation 10 of the drum assembly 1 and are at a regular angular spacing around the body 8 of that assembly.

The wiper assembly 3 has twenty wiper blades 11 which co-operate with the twenty slip rings respectively and of which only eight are shown. These wiper blades 11 are moulded or otherwise secured in a bar 12 of electrical insulating material so that their ends remote from the slip rings 9 extend from that bar to provide terminals 13. The bar 12 is attached to a bracket 14 which is pivotally mounted on the framework 5 so as to permit the disengagement of the wiper blades 11 from the slip rings 9 and thereby facilitate the removal of the drum assembly 1. In this respect, the drum assembly 1 is held by nuts 15 and 16 on end plates 17 and 18 of the contact bank 2, these end plates being attached to the frame work 5.

The contact bank 2 includes ten electric contact arcs 19 which are provided with ten terminals 20 respectively and which are insulated electrically from each other and from the framework 5. These contact arcs 19 are all of the same length and are alined along and concentric with the drum assembly 1. Corresponding contact springs 7 in the rows are all associated with the same one of these contact arcs 19. Each contact spring 7 is of sufficient length for its free end to engage the associated contact arc 19 but is inclined as shown in FIGURE 1 so as normally not to engage this arc when the drum assembly 1 is rotated.

The length of each contact arc 19 is such that a predetermined number of its associated contact springs 7 have their free ends adjacent thereto in all angular positions of the drum assembly 1. This predetermined number is less than the total number, i.e., twenty, of contact springs 7 associated with each contact arc 19 for a reason that will become apparent and is the same for every contact arc 19. This number determines the maximum number of digits that can be stored simultaneously by this storage arrangement and is ten in the present example.

In the operating mechanism 4, the ten push-buttons 6 are carried by ten levers 21 respectively. The levers 21 associated with one row of push-buttons 6 are arranged to pivot on a rod 22 and the other levers 21 are arranged to pivot on a rod 23, these rods 22 and 23 being supported at their ends by the framework 5. The levers 21 normally are biased by springs 24 so that portions 25 thereof abut the framework 5 to determine normal positions for the push-buttons 6. Further portions 26 of the levers 21 extend through slots in a pivoted plate 27 and have wedge-shaped members 28 attached to their free ends. Each wedge-shaped member 28 is adjacent to one end of a different one of the contact arcs 19 and is approximately radial to the drum assembly 1. Ten pins 29 are carried by the ten levers 21 respectively.

A pivoted arm 30 co-operates with the pivoted plate 27, this arm and this plate normally being retained in the positions shown by a spring 31 which engages the arm. A pawl 32 is attached to the arm 30 and co-operates with a ratchet wheel 33 at one end of the drum assembly 1. A detent 34 supported by the framework 5 also co-operates with the ratchet wheel 33 which has twenty teeth. It is arranged by means of the pawl 32, the ratchet wheel 33 and the detent 34 that the drum assembly 1 is rotatable in the direction indicated by the arrow 35 in FIGURE 2 to twenty different angular positions in each of which the contact springs 7 in a different one of the rows are located just ahead of the leading ends of the contact arcs 19 with their ends adjacent to the wedge-ends of the wedge-shaped members 28.

Upon the actuation of any push-button 6, for example, the push-button **6*k* (FIGURE 2), the lever 21*k* is turned about the rod 22 against the action of the spring 24*k*. Consequently the associated wedge-shaped member 28*k* is moved lengthwise towards the axis 10 of the drum assembly 1. As the result of this movement, the wedge-shaped member 28*k* engages the free end of the then adjacent contact spring 7*k* and then deflects this spring across the leading end of the associated contact arc 19*k*. When the lever 21*k* has turned through a small angle, its pin 29*k* engages the pivoted plate 27 whereafter this plate and the pivoted arm 30 are turned about their respective pivots 36 and 37 with this lever and against the action of the spring 31. Due to this turning of the arm 30 the pawl 32 causes the ratchet wheel 33 and hence the drum assembly 1 to rotate in the direction of the arrow 35. After one twentieth of a revolution the detent 34 engages the next tooth on the ratchet wheel 33 and shortly after this occurs further movement is inhibited by a lip 38*k* on the push-button 6*k* engaging the framework 5. This push-button 6*k* then is released thereby allowing the springs 24*k* and 31 to restore the lever 21*k*, the plate 27 and the arm 30** to their normal positions.

Because of the rotation of the drum assembly 1 the deflected contact spring **7*k* is brought to the angular position occupied by the contact spring 7*l* in FIGURE 2 but on the opposite side of the contact arc 19*k* to normal. Consequently the contact spring 7*k* engages this contact arc 19*k* to complete an electric circuit between one of the terminals 20 which corresponds to the value of the digit stored by operating the push-button 6*k* and one of the terminals 13 which corresponds to the particular digit store in which this digit is stored. Thus, if the slip ring 9*u* say is connected to the row of contact springs 7*a* to 7*k*, this circuit is between the terminal 20*k* and the terminal 13*u*. This electric circuit is maintained until the drum assembly 1 carries the deflected contact spring 7*k* past the other end of the contact arc 19*k* when this spring resumes its normal positon. This occurs during the rotation of the drum assembly 1 which results from the tenth actuation of a push-button 6 succeeding that which resulted in the deflection of the contact spring 7*k***.

The data storage arrangement described above forms part of a key-sending equipment which is for use in automatic telephone systems and which is shown diagrammatically in FIGURE 3. Referring to FIGURE 3, in addition to this data storage arrangement which is represented by the block 39, the key-sending equipment comprises a rotary electric switch 40 and an electric pulse train generator 41. The pulse generator 41 has ten input leads 42 and a control lead 43 and is arranged so that upon the connection of this control lead to any particular one of these input leads it supplies to a pair of output terminals 44 thereof a number of electric current pulses between one and ten that is determined by this particular input lead. In this respect, each input lead 42 corresponds to a different number of such pulses. The pulse train generator 41 supplies pulses to the output terminals 44 at the conventional rate for automatic telephone systems of ten per second.

The ten input leads 42 are connected to the ten terminals 20 of the data storage arrangement 39 so that the terminal 20 corresponding to any particular one of the ten decimal digit numbers one to ten and the input lead 42 corresponding to the same number of pulses are connected together. The control lead 43 is connected to a wiper blade 45 of the rotary switch 40 which has twenty bank contacts 46 associated with this wiper blade. These twenty bank contacts **46*a* to 46*u* are connected to the terminals 13*a* to 13*u* of the twenty wiper blades 11*a* to 11*u* (FIGURES 1 and 2) respectively. Consecutive contacts 46 round the bank of the switch 40 in the direction of rotation of the wiper blade 45 that is indicated by the arrow 47 thus are connected to the wiper blades 11 associated with consecutive rows of the contact springs 7 round the drum assembly 1** in the opposite direction to that in which it is rotated.

During operation of the key-sending equipment, the push-buttons 6 of the data storage arrangement 39 corresponding to the values of the digits of a telephone number are actuated in the order of these digits in this number. It is arranged in any suitable manner that the first push-button 6 to be actuated completes an electric circuit between the particular one of the bank contacts 46 on which the wiper blade 45 then is standing and one of the terminals 20. Consequently the generator 41 immediately starts supplying the output terminals 44 with a train of pulses corresponding to the first digit of the said telephone number.

After a short pause following the sending of this train of pulses the generator 41 causes the rotary switch 40 to rotate the wiper blade 45 in the direction of the arrow 47 to the next bank contact **46*b* thereby selecting the data store in the storage arrangement 39 that is storing the second digit of the said telephone number. The sequence continues until trains of pulses corresponding to all the digits of the telephone number have been supplied to the output terminals 44. It will be appreciated that in practice these output terminals 44** are connected to an automatic telephone exchange (not shown) via the line wires (not shown) of a telephone line at least during operation of the key-sending equipment.

Referring to FIGURES 4, 5 and 6, the second example of data storage arrangement also forms part of key-sending equipment which, as is indicated in FIGURE 4, is incorporated in a telephone subscribers instrument 50 in place of a conventional telephone dial. This storage arrangement has fifteen digit stores and comprises a rotatable drum assembly 51 which incorporates these stores, a contact bank 52 and an operating mechanism 53 all carried by a metal framework 54. The operating mechanism 53 has its ten push-buttons 55, of which only two are shown, arranged in two parallel rows of five each.

It should be mentioned here that FIGURE 4 is a cross-sectional elevation on the line A—A of FIGURE 6. Also FIGURE 6 shows a plan section of the operating mechanism 53 on the line B—B of FIGURE 4 with the framework 54 cut away and a plan section of the contact bank 52 on the line C—C of FIGURE 4.

Each digit store comprises a different one of fifteen rows of contact springs 56 which extend outwardly from the body 57 of the drum assembly 51 and which are inclined rearwardly relative to the direction of rotation of that assembly that is indicated by the arrow 58 in FIGURE 4. These rows are parallel to the axis of rotation 59 of the drum assembly 51 and are at a regular angular spacing around the body 57 of that assembly. Each row comprises five contact springs 56 in two groups of three and two contact springs respectively. For example, the contact springs 56*a*, 56*b* and 56*c* in one row form one group and the contact springs 56*d* and 56*e* in the same row form the second group. The contact springs 56 in each group of three are electrically connected to each other and to an individual one of fifteen electric terminals 60 of the drum assembly 51 and the contact springs 56 in each group of two are electrically connected to each other and to an individual one of fifteen electric terminals 61 of the drum assembly. The groups of contact springs 56 are insulated electrically from each other and from the framework 54 by the body 57.

The contact bank 52 includes five electric contact arcs 62 which are provided with five terminals 63 respectively and which are insulated electrically from each other and from the framework 54. These contact arcs 62 are all of the same length and are alined in the direction of the axis 59 of the drum assembly 51. Each contact arc 62 is generally L shaped in cross section and has a curved lip portion 64 which corresponds to the short arm of this L section and which is concentric with the axis 59.

Corresponding contact springs 56 in the rows are all associated with the same one of these contact arcs 62. Each contact spring 56 is of such a length that upon rotation of the drum assembly 51, a laterally extending contact portion 65 at its free end normally passes alongside but does not engage the surface of the lip portion 64 of its associated contact arc 62 that faces outwardly away from the drum assembly. As in the previous example, the length of each contact arc 62 is such that ten of the associated contact springs 56 have their contact portions 65 adjacent to the lip portion 64 of that arc in all angular positions of the drum assembly 51. Consequently up to ten digits can be stored at the same time in ten of the digit stores respectively.

In the operating mechanism 53, the ten push-buttons 55 are carried by ten flat slide members 66 respectively. Each slide member 66, for example, the slide member 66*a* comprises an elongated strip portion 67*a* and two arm portions 68*a* and 69*a* extending from the same edge of and at right angles to this strip portion 67*a*. The strip portion 67*a* passes freely through slots in a main chassis 70 and a sub-chassis 71 of the framework 54 and has the arm portion 68*a* at one end and the associated push-button 55*a* at the other end. This arm portion 68*a* has a stud portion 72*a* extending from one edge at its free end and away from the arm portion 69*a* which is between the ends of the strip portion 67*a*.

The arm portion 69*a* has a hook portion 73*a* extending from one edge at its free end and through a slot in the main chassis 70 and has teeth 74*a* extending from its opposite edge towards the arm portion 68*a*. These teeth 74*a* are in two of five possible positions to give a tooth arrangement that is unique to this slide member 66*a*. In this respect, the slide member 66*a*, like every other one of the slide members 66 initially has five teeth 74 in a comb-like formation, the unwanted teeth being removed. Although the slide member 66*a* has two teeth 74*a* as also do each of the slide members 66*b*, 66*c*, 66*g* and 66*j*, the other four slide members 66*d*, 66*e*, 66*f* and 66*k* only have one tooth 74 each.

Springs 75 which embrace the strip portions 67 normally maintain the slide members 66 in the raised position as shown wherein they abut the framework 54. Movement of these slide members 66 by means of the push-buttons 55 normally is prevented by a lever 76 which is controlled by the cradle-switch mechanism (not shown) of the telephone instrument 50 and which is arranged to engage the hook portions 73 when this instrument is not in use.

The stud portions 72 of the slide members 66 are engaged by a plate 77 which has a pivot 78 at one end and a forked extension 79 (FIGURE 5) at the other end. Part 80 of the sub-chassis 71 is adjacent to this extension 79 and has a generally trapezoidal aperture 81 therein. A roller 82 carried at one end of a toggle bar 83 extends through this aperture and is engaged by the forked member 79. The other end of the toggle bar 83 is coupled by a pivot 84 to a strip 85 which is able to slide in slots in upturned portions 86 and 87 of the sub-chassis 71. A pawl 88 is carried by the strip 85 and co-operates with a ratchet wheel 89 in the drum assembly 51. The pawl 88 and the strip 85 normally are retained in the position indicated in FIGURE 5 by a leaf spring 90 carried by the main chassis 70. A detent 91 attached to the main chassis 70 also co-operates with this ratchet wheel 89 which has fifteen regularly spaced teeth. Thus it is arranged that the drum assembly 51 is rotatable to fifteen different angular positions in each of which the contact springs 56 in a different one of the rows are located just ahead of the leading ends of the contact arcs 62. In FIGURES 4 and 6, the contact springs 56*a* to 56*e* are so located.

Five bent strips 92 are associated respectively with the five positions possible for the teeth 74 of the slide members 66. These strips 92 all are pivoted on a rod 93. One end portion 94 of each strip 92 extends through an aperture in the main chassis 70 and engages a leaf spring 95 which acts to hold the strips 92 in engagement with the teeth 74 of the slide members 66. Five slide bars 96 are associated respectively both with the five strips 92 and with the five contact arcs 62 of the contact bank 52. These slide bars 96 are able to slide in further slots in the upturned portions 86 and 87 of the sub-chassis 71.

Each slide bar, for example, the slide bar 96*a* has a raised catch portion 97*a* at one end and carries an insulating roller 98*a* at the other end, this roller being adjacent to the leading end of the associated one 62*a* of the contact arcs 62. The catch portion 97*a* is for co-operating with a common latching plate 99 which is pivotally mounted on the upturned portion 86 of the sub-chassis 71 and biassed to engage the slide bars 96 by springs 100. A further roller 101*a* on the slide bar 96*a* normally is lightly engaged by an inclined tongue portion 102*a* of the associated strip 92*a*. Such engagement is obtained by means of a spring 103*a*.

It may be arranged that the lever 76 is disengaged from the hook portions 73 of the slide members 66 upon the removal of the handset (not shown) of the telephone instrument 50 from the cradle 104. Having released the slide members 66, any particular one of the said ten decimal digit values may be stored by depressing the appropriate push-button, for example, the push-button 55*a*. The corresponding movement of the associated slide member 66*a* produces two effects. One of these effects is that the two teeth 74*a* of the slide member 66*a* displace the strips 92*c* and 92*e* respectively about the rod 93. Consequently the tongue portions 102*c* and 102*e* of these strips 92*c* and 92*e* bear on the rollers 101*c* and 101*e* and displace the associated slide bars 96*c* and 96*e* lengthwise towards the drum assembly 51. The catch portions 97*c* and 97*e* of these slide bars 96*c* and 96*e* cause the latching plate 99 to pivot so as to release the slide bar 96*b* which is shown as being latched. When the catch portions 97*c* and 97*e* pass under the latching plate 99 the springs 100 are able to restore this plate and thereby latch the slide bars 96*c* and 96*e*. During the lengthwise movement of the slide bars 96*c* and 96*e* the associated contact springs 56*c* and 56*e* in the row then located just ahead of the leading ends of the contact arcs 62 are deflected by the rollers 98$c$ and 98$e$ on these slide bars so that their contact portions 65$c$ and 65$e$ are adjacent to the inwardly facing surfaces of the lip portions 64$c$ and 64$e$ of the contact arcs 62$c$ and 62$e$.

The other effect produced by the movement of the slide member 66$a$ is that the stud portion 72$a$ causes the plate 77 to turn about its pivot 78 so that its forked extension 79 causes lengthwise movement of the strip 85 through the medium of the toggle bar 83 towards the drum assembly 51. Thus the pawl 88 is caused to engage the next tooth 105 round the ratchet wheel 89 in the opposite direction to that in which the drum assembly 54 rotates.

When the push-button 55$a$ is released the slide member 66$a$ is restored by the spring 75$a$ thereby enabling the spring 90 to restore the strip 85, the toggle bar 83, the plate 77 and the pawl 88. Consequently the drum assembly 51 is turned in the direction of the arrow 58 one fifteenth of a revolution. Because the slide bars 96$c$ and 96$e$ are latched by the latching plate 99 the contact portions 65$c$ and 65$e$ of the deflected contact springs 56$c$ and 56$e$ are moved into engagement with the inwardly facing surfaces of the lip portions 64$c$ and 64$e$ of the contact arcs 62$c$ and 62$e$. Thus two electric circuits are completed respectively between the terminals 60$b$ and 63$c$ and between the terminals 61$b$ and 63$e$, these circuits characterising the digit value allocated to the push-button 55$a$ which has been actuated.

These electric circuits are maintained until the drum assembly 51 carries the deflected contact springs 56$c$ and 56$e$ past the other ends of the contact arcs 62$c$ and 62$e$ when these springs resume their normal positions. This occurs during the rotation of the drum assembly 51 which results from the tenth actuation of a push-button 55 succeeding that which resulted in the deflection of the contact springs 56$c$ and 56$e$.

The key-sending equipment of which this second example of data storage arrangement forms part also includes a rotary switch 106, a pair of electric contact springs 107 and a control cam 108 all of which are shown in FIGURE 6 and electronic decoding and pulse supply equipment which is represented by the block 109 in FIGURE 4. The switch 106 is arranged to rotate with the drum assembly 51 and comprises an electromagnet 110, a circular contact carrying plate 111 of electrical insulating material supported by pillars 112, a wiper 113 and a pawl and ratchet mechanism 114 operable by the electro magnet 110 to rotate the wiper 113 relative to the contact plate 112 and in the opposite direction to the drum assembly 51. The cam 108 rotates with the wiper 113 and is arranged to permit the contact springs 107$a$ and 107$b$ to engage in all but one of fifteen possible angular positions of the wiper 113.

The electronic decoding and pulse supply equipment 109 has four input terminals 115, 116, 117 and 118 and two output terminals 119 and 120 for connection to the line wires of a telephone line (not shown). This equipment 109 is arranged to supply different numbers of electric current pulses to the output terminals 119 and 120 in response to the earthing of different ones of the input terminals. More precisely, the electronic equipment 109 is arranged to supply to the output terminals 119 and 120 one, two, three, four, five, six, seven, eight, nine and ten such pulses respectively in response to the earthing of the terminal 115 only, the terminal 116 only, both the terminals 115 and 116, the terminal 117 only, both the terminals 115 and 117, both the terminals 116 and 117, all the terminals 115, 116 and 117, the terminal 118 only, both the terminals 115 and 118, and both the terminals 116 and 118. These pulses have a recurrence rate of ten per second.

Reference should now also be made to FIGURE 7 which shows diagrammatically the electric circuit of the key-sending equipment. In this circuit, the terminal 63$a$ of the contact arc 62$a$ is connected via two similarly poled rectifier elements 123 and 124 to the input terminals 115 and 116 respectively of the electronic equipment 109. The terminals 63$b$, 63$c$, 63$d$ and 63$e$ of the other four contact arcs 62$b$, 62$c$, 62$d$ and 62$e$ are directly connected respectively to the four input terminals 115 to 118 of this equipment 109.

The contact carrying plate 111 has thirty contacts 121 and 122 arranged at a regular angular spacing around this plate. Fifteen consecutive contacts 121 are connected to the fifteen terminals 60 respectively of the drum assembly 51 and the other fifteen consecutive contacts 122 are connected to the other fifteen terminals 61 of that assembly. It is arranged that any two diametrically opposite contacts of the plate, for example, the contacts 121$b$ and 122$b$ are connected to the terminals 60$b$ and 61$b$ which are associated with the same row of contact springs 56$a$ to 56$e$ in the drum assembly 51. It is also arranged that consecutive contacts 121 and 122 around the plate in the direction 58 of rotation of the drum assembly 51 are associated with consecutive rows of the contact springs 56 around the drum assembly 51 in the same direction.

The wiper 113 is rotatable by the electromagnet 110 and the pawl and ratchet mechanism 114 to fifteen different angular positions in each of which it engages a different pair of diametrically opposite contacts 121 and 122 of the plate 111. The direction of rotation of the wiper 113 and the cam 108 is indicated in FIGURE 7 by an arrow 125 and is opposite to the direction 58 of rotation of the drum assembly 51 and the rotary switch 106. The wiper 113 is connected electrically to the framework 54 in all of its positions, this framework being earthed.

Before describing the operation of this key-sending equipment it should be mentioned that in FIGURE 7, the contact springs 56 in the ten rows associated with the ten terminals 60$c$ to 60$m$ respectively are shown as storing the decimal digit values ten, nine, eight, seven, six, five, four, three, two and one respectively. It should also be mentioned that the electronic equipment 109 has already supplied series of pulses to the output terminals 119 and 120 corresponding to these stored digit values.

The quiescent state of the key-sending equipment corresponds to the contacts 107 opened by the cam 108 and the wiper 113 engaging the pair of contacts 121 and 122 associated with the particular row of contact springs 56 that will store the next digit entered by the actuation of one of the push-buttons 55. This can be any one of the fifteen rows of contact springs 56 and in FIGURE 7 it is shown as the row comprising the contact springs 56$a$ to 56$e$, the wiper 113 engaging the contacts 121$b$ and 122$b$ so that these contact springs all are earthed.

When the key-sending equipment is to be used for sending to an automatic telephone exchange (not shown) connected via the terminals 119 and 120 trains of electric pulses corresponding to the values of the digits of a telephone number, the push-buttons 55 corresponding to these digits are actuated in the order of the digits in this number. Consecutive digit values of the telephone number are stored in the manner previously described in the consecutive rows of contact springs 56 associated with the terminals 60$b$, 60$a$, 60$p$, 60$o$ and so on respectively. Immediately storage commences, the drum assembly 51, the rotary switch 106 including the wiper 113 and the cam 108 are rotated in the direction indicated by the arrows 58. Thus the contacts 107 engage to complete a supervisory circuit (not shown) for the electronic equipment 109 which is arranged only to be able to function when this supervisory circuit is completed.

With the storing of the first digit value of the telephone number one or more of the contact arcs 62 are engaged by their associated ones of the contact springs 56$a$ to 56$e$.

Thus one or more of the input terminals 115 to 118 of the electronic equipment 109 are earthed via the wiper 113 thereby causing this equipment 109 to supply its output terminals 119 and 120 with a number of pulses corresponding to this first digit value. After a predetermined inter-train pause of, for example, 400 milliseconds the electronic equipment 109 supplies a single energising pulse to the electromagnet 110 thereby causing the pawl and ratchet mechanism 114 to turn the wiper 113 one fifteenth of a revolution in the direction of the arrow 125 so that it engages the contacts 121*a* and 122*a* associated with the digit store which is storing the second digit value of the said telephone number. The cam 108 turns with the wiper 113 back towards the position in which it opens the contacts 107.

This sequence continues and eventually the last digit value of the said telephone number is sent out by the electronic equipment 109 as a train of electric pulses. After the succeeding inter-train pause the wiper 113 and the cam 108 are again turned one fifteenth of a revolution in the direction of the arrow 125. The wiper engages two contacts, for example, the contacts 121*k* and 122*k* which are associated with the digit store comprising contact springs 56*m* and 56*q* that will store the next digit value to be entered by the actuation of one of the push-buttons 55. The cam 108 opens the contacts 107 to break the said supervisory circuit and thereby inhibit the electronic equipment 109. In the latter respect, it will be appreciated that in storing a telephone number of $n$ digits the cam 108 is stepped $n$ times in the direction of the arrow 58 and in sending out the trains of pulses corresponding to the values of these digits the cam 108 is stepped $n$ times in the opposite direction to resume its original position.

The key-sending equipment described above may be provided with a "cancel" key which when operated causes the electronic equipment 109 to supply pulses to the electromagnet 110 until the said supervisory circuit is broken by the opening of the contacts 107. Such a cancel key enables incorrect telephone numbers to be cleared from the data storage arrangement.

I claim:

1. A data storage arrangement comprising first support means, second support means, drive means carried by said first support means and coupled to said second support means for moving said second support means relative to said first support means upon each actuation of that drive means, a plurality of resilient members which are carried by one of said support means and which each has a normal position and a deflected position, a plurality of deflecting members which are carried by the other one of said support means and which are actuable each to displace a different one of said resilient members from its normal position to its deflected position, a plurality of interposing members which are carried by said other one of said support means and each of which is interposed between the normal and deflected positions of a different one of said resilient members upon the relative movement between said support means that results from the actuation of said drive means whereby any resilient member deflected by its deflecting member engages and is held deflected by the associated interposing member independently of that deflecting member, a plurality of push-type operating members which are actuable manually to enter data to be stored and coupling means which couples said operating members selectively to said deflecting members and in common to said drive means whereby, upon the actuation of any operating member, at least one resilient member is deflected by its deflecting member and the drive means is actuated to obtain the engagement of that resilient member with its associated interposing member.

2. A data storage arrangement according to claim 1 wherein said coupling means couples each operating member to a different one of said deflecting members.

3. A data storage arrangement according to claim 1 wherein said coupling means couples at least one of said operating members to a combination of said deflecting members.

4. A data storage arrangement comprising first support means, second support means, drive means carried by said first support means and coupled to said second support means for moving said second support means relative to said first support means upon each actuation of that drive means, a plurality of resilient members which are carried by one of said support means and which each has a normal position and a deflected position, said resilient members being arranged in groups that are regularly spaced along the direction of said relative movement at intervals equal to the amount of that relative movement which results from each actuation of said drive means, a plurality of deflecting members which are carried by the other one of said support means so as to be juxtaposed with a different one of said groups of resilient members as the result of each of a succession of actuations of said drive means and which are actuable each to displace a different one of the resilient members of any juxtaposed group from its normal position to its deflected position, a plurality of interposing members which are carried by said other one of said support means and each of which is interposed between the normal and deflected positions of a different one of the resilient members of any said juxtaposed group upon the relative movement between the two said support means that results from the actuation of said drive means whereby any resilient member of that group that is deflected by its deflecting member engages and is held deflected by the associated interposing member independently of that deflecting member, a plurality of operating members which are actuable manually to enter data to be stored and coupling means which couples said operating members selectively to said deflecting members and in common to said drive means whereby, upon the actuation of any operating member, at least one resilient member of any group then juxtaposed with said deflecting members is deflected by its deflecting member and the drive means is actuated to obtain the engagement of that resilient member with its associated interposing member.

5. A data storage arrangement comprising first support means, second support means, drive means adapted, upon each actuation thereof, to move said second support means a predetermined amount relative to said first support means, a plurality of resilient members which are carried by one of said support means and which each has a normal position and a deflected position, said resilient members being in groups that are regularly spaced along the direction of said relative movement at intervals equal to said predetermined amount of that movement, a plurality of deflecting members which are carried by the other one of said support means so as to be juxtaposed with a different one of said groups of resilient members as the result of each of a succession of actuations of said drive means and which are actuable each to displace a different one of the resilient members of any juxtaposed group from its normal position to its deflected position, a plurality of operating members which are actuable manually to enter data to be stored, coupling means which couples said operating members selectively to said deflecting members and in common to said drive means whereby the actuation of any operating member produces the deflection of at least one resilient member of the group then juxtaposed with said deflecting members and an actuation of said drive means, and a plurality of elongated interposing members which are carried by said other one of said support means and each of which is interposed between the normal and deflected positions of a different one of the resilient members of said juxtaposed group when said drive means is actuated whereby any deflected resilient member of that group that is deflected by its deflecting member engages and is held deflected by the associated interposing member independently of that deflecting member, each interposing member extending along the direction of said relative movement for a distance at least approximately equal to an integral multiple of the predetermined amount of such movement whereby any resilient member which engages that interposing member as the result of the actuation of an operating member thereafter disengages that interposing member and restores to its normal position as the result of the last of a predetermined plurality of succeeding actuations of operating members.

6. A data storage arrangement according to claim 5 wherein said interposing members are of equal length.

7. A data storage arrangement according to claim 5 wherein said resilient members comprise electric contact springs and said interposing members comprise elongated electric contact strips.

8. A data storage arrangement according to claim 7 wherein said deflecting members and said interposing members are carried by said first support means and said resilient members are carried by said second support means whereby these resilient members are moved relative to said deflecting members and said interposing members upon each actuation of said drive means.

9. A data storage arrangement according to claim 8 wherein said second support means is carried by said first support means and comprises an assembly which is rotatable about a predetermined axis and which has said contact springs in rows parallel to said axis that each comprises a different one of said groups of resilient members, and wherein said interposing members are curved so as to be concentric with that axis.

10. A data storage arrangement according to claim 9 wherein said assembly includes a plurality of terminal members and a plurality of conductor portions that provide connections between the contact springs and the terminal members.

11. A data storage arrangement according to claim 10 wherein said terminal members comprise slip rings and wherein there are a plurality of wipers which each cooperate with a different one of these slip rings.

12. A data storage arrangement according to claim 11 wherein each row of contact springs is connected to a different one of said slip rings by an individual one of said conductor portions.

13. A data storage arrangement according to claim 12 wherein each operating member is actuable to move a different one of the deflecting members.

14. A data storage arrangement according to claim 10 wherein each said row comprises two separate groups of contact springs and wherein the contact springs of each group are connected to a different one of said terminal members by an individual one of said conductor portions.

15. A data storage arrangement according to claim 14 wherein at least one of the operating members is actuable to move two deflecting members which are associated with contact springs in the two groups respectively of each row.

16. A data storage arrangement according to claim 9 wherein said assembly includes a ratchet wheel and wherein said drive means comprises a pawl which co-operates with this ratchet wheel for rotating said assembly.

17. A data storage arrangement which is according to claim 5 and which is for storing the digit values of a telephone number that are entered sequentially by the selective actuation of said operating members, in combination with switching means operable to select in a corresponding sequence the groups of said resilient members in which these digit values are stored, and signalling means which has an output circuit for connection to the line wires of a telephone line and which is to supply electric signals to this output circuit that characterise in a predetermined manner the digit value stored in any row of said resilient members selected by said switching means.

References Cited by the Examiner

UNITED STATES PATENTS

| | | | |
|---|---|---|---|
| 3,073,928 | 1/1963 | Olsson | 200—105 |
| 3,192,342 | 6/1965 | Rovnyak et al. | 200—105 |
| 3,213,238 | 10/1965 | Lundell | 200—105 |
| 3,257,535 | 6/1966 | Sallin et al. | 200—105 X |

ROBERT K. SCHAEFER, *Primary Examiner.*

J. R. SCOTT, *Assistant Examiner.*